Inventors:
Leo C. Rademaker,
Roy H. Dierstein,
by Henry J. Maciniak
Attorney.

3,074,149
METHOD OF MAKING A HERMETICALLY
SEALED CABLE ENTRY
Leo C. Rademaker and Roy H. Dierstein, Fort Wayne, Ind., assignors to General Electric Company, a corporation of New York
Filed Jan. 21, 1960, Ser. No. 3,895
3 Claims. (Cl. 29—155.5)

This invention relates to a method of hermetically sealing a conductor cable entry and construction therefor. More particularly, it relates to a method of bringing leads, which are subjected to relatively high voltages, out of a hermetically sealed unit to effect a cable entry that will be free of corona during operation of the unit.

In many electrical applications, it is required that hermetically sealed units containing electrical apparatus such as a transformer, crystal, condenser, filter, power pack, and other similar apparatus, be provided with a number of conductor cables or terminal leads that are brought out through the casing. At the point of entry the conductor cables form a fluid and pressure tight or hermetically sealed joint. The hermetically sealed joint prevents moisture from entering the casing, maintains the space within the sealed unit at a controlled pressure and permits the unit to be utilized in an environment where deterioration caused by exposure to such environment would affect or destroy the internal elements of the unit or materially affect the operating efficiency thereof. When the sealed unit is subjected to relatively high voltages, a corona discharge may take place between the terminal connections at the point of entry and the casing of the sealed unit. The corona problem becomes particularly acute when the hermetically sealed unit is to be used at higher altitudes because of the poorer insulating characteristics of air at the higher altitudes.

In order to keep corona at a minimum in such high voltage applications, heretofore, ceramic bushings were generally used. When a ceramic bushing is used at the point of entry, to bring out a lead out from the hermetically sealed unit, it is required that a fluid and pressure tight seal be effected between the ceramic material and the metal of the sealed unit. This has resulted in more expensive types of cable entry assemblies. Also, in such conventional cable entry assemblies it was necessary to protect the ceramic bushing from possible damage which might result from the transmission of shock and vibration from the casing to the ceramic material.

A principal drawback of the prior art method and constructions, insofar as corona is concerned, is that connections generally had to be made at the cable entry assembly. As an example, in one prior art method the cable entry connections had to be sealed with a silicon grease to prevent corona discharge from taking place between the cable entry connection and the nearest high voltage point.

Difficulties have also arisen as a result of corona discharge in prior art methods whereby a rubber bushing is compressed by a stud bolt to form a tightly fitting assembly at the point of entry. In such prior art cable entry assemblies, the rubber bushing is longitudinally compressed along the stud bolt, thereby expanding the bushing outwardly against an aperture in the casing of the hermetically sealed unit and expanding the bushing inwardly against the stud bolt. The disadvantage of such a method of effecting a conductor cable entry is that the cable must be connected to the stud bolt at each end thereby requiring connections located at a closer distance to the casing and aggravating the corona effects. Thus, it is desirable that in order to improve the corona characteristics of a hermetically sealed unit that any additional connections at the point of entry of a terminal lead be eliminated.

A general object of the invention is to provide a improved method of effecting a conductor cable entry through a hermetically sealed unit.

A more specific object of the invention is to provide a method for effecting the entry of a lead terminal through the casing of a hermetically sealed unit without need for additional connections at the point of entry.

A further object of the present invention is to provide a conductor cable entry through a hermetically sealed unit that is inexpensive to produce and install.

In accordance with the invention an entry of the cable through the casing of the hermetically sealed unit is obtained by first forming an aperture in the metallic casing having an arcuate stepped-up base portion with a sealing collar projecting outwardly from the base portion. The internal diameter of the collar is susbtantially equal to the outer diameter of a resilient insulating bushing which is interposed concentrically within the aperture around the conductor cable or terminal lead. The arcuate stepped-up base portion of the projection formed about the aperture is provided with sufficient curvature so that when a force is uniformly applied around the outer surface of the arcuate portion, the resulting deformation causes a reduction between ten and twenty percent in the internal diameter of the collar.

After the arcuate stepped-up base portion is formed, the resilient insulating bushing is placed on the conductor cable, which is to be brought out, and the bushing is located in its final assembled position on the cable. The resilient bushing and the cable are then inserted within the aperture provided by the collar. The next step in the process is to apply a compressive force uniformly about the outer surface of the arcuate stepped-up base portion to deform it so that it is substantially flush with the casing of the hermetically sealed unit. The deformation of the base portion is carried out until approximately between ten to twenty percent reduction in the internal diameter of the collar is brought about. Thus, after the stepped-up base portion is deformed, the collar exerts a radially compressive force against the resilient insulating bushing and also exerts an inward pressure against the conductor cable. Thus, the casing, the insulating bushing, and the conductor cable are sealingly engaged in the aperture formed in the collar, and a hermetic seal is effected.

In another aspect of the invention, the insulating bushing and the cable are preassembled on a plate member formed with an arcuate stepped-up base portion and a sealing collar. Before attaching the casing of the hermetically sealed unit, the arcuate stepped-up base portion is deformed to effect a reduction of the diameter of the sealing collar. The plate is then attached to the casing of the sealed unit at the point of entry by welding or other well-known methods of obtaining fluid and pressure tight metal to metal joints.

The subject matter which we regard as our invention is set forth in the appended claims. The invention itself, together with further objects and advantages thereof, may be understood by referring to the following description taken in connection with the accompanying drawings in which:

Figures 1, 2, 3, 4:
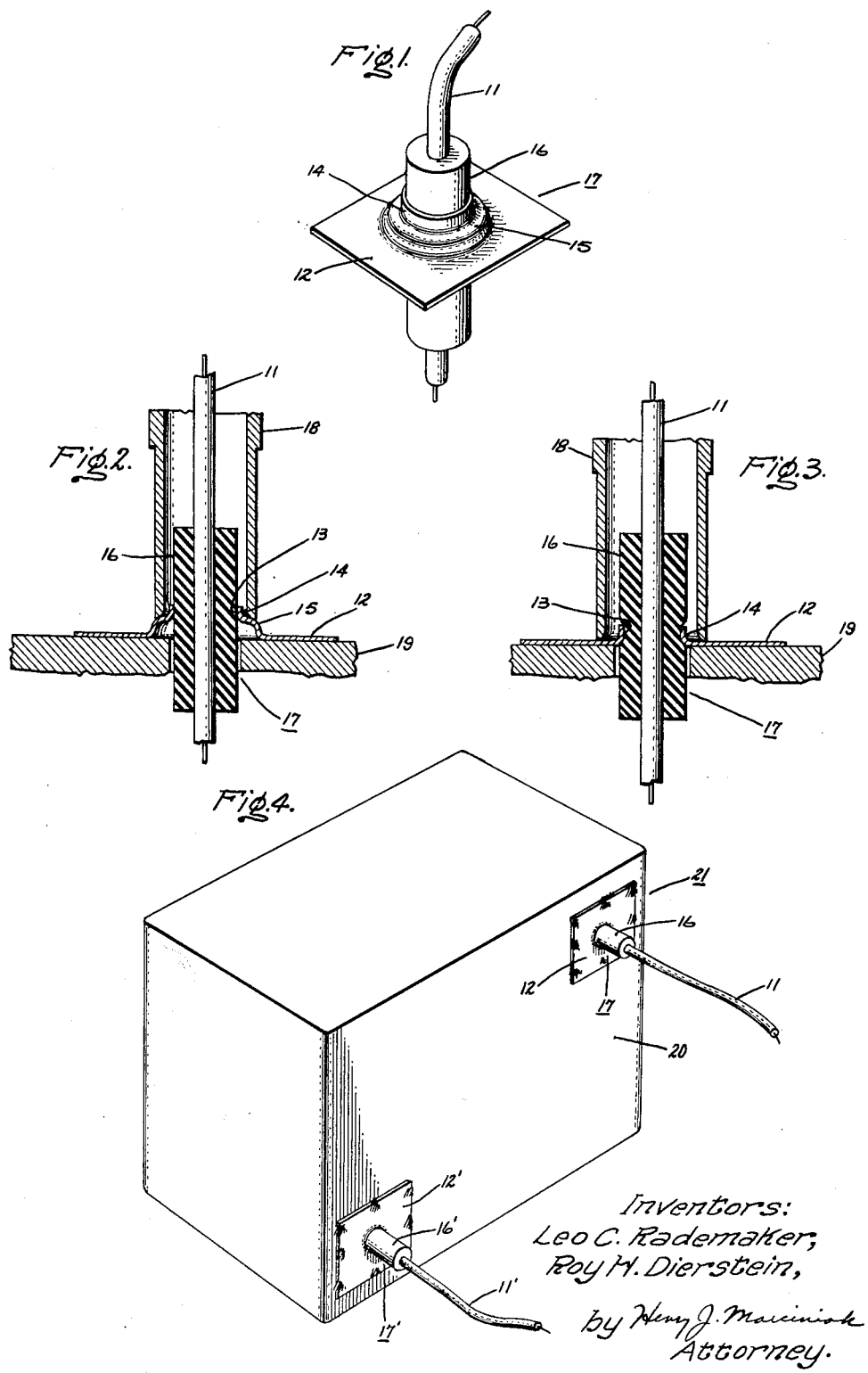
FIG. 1 illustrates a perspective view of the plate formed with the stepped-up base portion and collar in accordance with the invention and shown in assembled relation with a conductor cable and resilient insulating bushing.
FIG. 2 is a sectional view of the assembly shown in FIG. 1, shown with a forming tool engaging the outer surface of the stepped-up base portion.
FIG. 3 is a sectional view similar to FIG. 2 illustrating the cable entry assembly after the arcuate stepped-up base portion has been deformed by the forming tool and a hermetic seal effected.
FIG. 4 is a perspective view showing a hermetically sealed unit with the terminal leads brought out of the sealed unit in accordance with the method of the invention.

While the method of the present invention may be used in connection with various types of hermetically sealed units, it is primarily adapted for bringing out a conductor cable 11, which is subjected to relatively high voltages, from a hermetically sealed unit. For purposes of illustration and explanation, it is assumed that the plate member 12, as shown in FIGS. 1 through 4, may be integrally formed with a hermetically sealed unit or that it may be a separate plate member and attached to the housing of a sealed unit by welding or by some other suitable means. It will be apparent that where it is not feasible to form the arcuate stepped-up base portion directly in the casing of the sealed unit because of the manner in which the casing is fabricated or because of the thickness of the casing, it is preferred that the separate plate member 12 be used.

Referring to FIG. 1 of the drawing, it will be seen that the first step of the method of this invention involves forming an aperture 13 in the casing or plate member 12. The aperture 13 is circumscribed by a sealing collar 14 and has an arcuate stepped-up base portion 15. Although it is not essential to the practice of the invention, it is preferable that the internal diameter of the collar 14 be such that a resilient insulating bushing can be readily inserted therein. Also, when it is inserted therein it should be slightly compressed so that the relative position of the bushing 16 with respect to the collar 14 can be maintained before and during the forming operation. The purpose of forming the arcuate stepped-up base portion 15 around the aperture 13 is to provide a surface upon which a force can be circumferentially applied to deform the curved surface and cause the internal diameter of the sealing collar 14 to be restricted to a diameter between ten and twenty percent of its original size and thereby sealingly engage the bushing 16 and conductor cable 11.

The resilient insulating bushing 16, the conductor cable 11 and plate member 12 comprise the cable entry assembly 17 of this invention. The resilient insulating bushing 16 is concentrically disposed and positioned on the conductor cable 11 within the aperture 13 as shown diagramatically in FIG. 2. A hollow cylindrical forming tool 18, only a portion of which is illustrated, is placed on the outer surface of the arcuate stepped-up portion 15. The forming tool 18 can be operated by a punch or arbor press (not shown) to accomplish the required deformation, or the deforming operation can be performed manually. It will be seen that the tool 18 exerts a force circumferentially on the surface of the stepped-up portion 15, which is held by a rigid support member 19, and the stepped-up base portion 15 is deformed downwardly. The effect of the applied force is to restore the stepped-up base portion in coplanar alignment with the plate member 12. The deformation of the stepped-up portion 15 is attended by a constriction of the aperture 13. We have found that the provision of a reduction in the aperture 13 between ten and twenty percent will provide a satisfactory seal. In the illustrated exemplification of the invention, the resilient bushing was fabricated out of silicon rubber. Any resilient insulating material such as natural rubber, synthetic rubber, or any of the various elastic plastics, which are being used as substitutes for rubber, may be employed in the practice of the invention. The vinyl and polyethylene plastics are examples of such other suitable materials.

As previously mentioned, the resilient bushing 16 is fabricated with an external diameter which is substantially equal to the diameter of the aperture 13 before it is constructed in accordance with the method of this invention. The internal diameter of the resilient bushing 16 is such that it can be readily positioned concentrically about the conductor cable 11 and will maintain its position on the conductor cable 11.

As shown diagrammatically in FIG. 3, the arcuate stepped-up portion 15 of the aperture 13 has now been deformed so that it is substantially flush with the casing or plate member 12. In this condition of deformation it will be seen that the sealing collar 14 exerts a compressive force radially against the resilient bushing 16 and also against the conductor cable 11. Accordingly, a hermetically sealed cable entry is effected.

A significant feature of this invention is that a hermetically sealed cable entry is obtained without any necessity for making additional connections for the purpose of bringing out conductor cable leads. As previously mentioned, if the aperture 13 is formed in the casing of the sealed unit, the conductor cable 11 and the resilient bushing 16 are inserted into the aperture 13 before the deforming step. It is therefore unnecessary to make any additional connections to the bushing as is required in some ceramic insulating entry assemblies of the prior art. If the method of accomplishing the entry of a terminal lead in accordance with the present invention is employed in connection with electrical apparatus which is subjected to shock or vibrations, it will be realized that there are no frangible components which might be damaged.

In FIG. 4, two composite cable entry assemblies 17, 17' are shown welded to a metallic casing 20 of a hermetically sealed unit 21 in which openings are provided to receive the resilient insulating bushing 16 and conductor cable 11. In this illustrated exemplification of the method of the present invention, the plate members 12, 12' were first sealingly engaged with the bushings 16, 16' and conductor cables 11, 11' by the method of this invention and then the plate members 12, 12' were welded to the metallic casing 21. The hermetic unit 21 was subjected to air pressure and hot water tests and was found to be air and water tight. Corona tests conducted on the unit indicated that the cable entries effected by the method of this invention compared favorably with well-known ceramic type of cable entry assemblies. In the electrical application in which the illustrated hermetic unit 21 was employed, the cable conductor 11, during its normal operation, carried 8,500 volts.

From the foregoing description it will be appreciated that the method of effecting a cable entry according to this invention involves simple steps that can be economically carried out and require parts which are inexpensive to produce and simple to install. The invention may be utilized to bring leads out of hermetically sealed electrical units such as filters, capacitors, transformers, relays, power packs and other electrical apparatus which may be affected by moisture or which may be subjected to various changes in temperatures and pressure such as would be present if the unit were operated at high altitudes. This method of bringing out terminal leads is particularly adaptable to conductor cables, although not limited thereto, subjected to high voltages since the method does not require any additional connections at the point of entry other than those normally made within the unit.

It will be understood that various modifications can be made to adapt the invention to other methods of connections and to many applications not described herein. Accordingly, we intend by the appended claims to cover all such modifications that fall within the true spirit and scope of the invention.

What we claim as new and desire to secure by Letters Patent of the United States is:

1. A method of making a fluid and pressure tight conductor cable entry through a metallic plate comprising the steps of: forming an aperture with an outwardly extending sealing collar with a surrounding outwardly extending annular stepped-up base portion in said metallic plate, inserting a cylindrical resilient insulating bushing within the aperture provided by said sealing collar, said bushing being concentrically disposed on the conductor cable and having an outside diameter substantially equal to the diameter of the aperture, and deforming said stepped-up base portion downwardly into generally coplanar relationship with the metallic plate to cause from ten to twenty percent reduction in the diameter of at least a portion of said sealing collar thereby causing a compressive force to be radially exerted by said sealing collar against said bushing and said conductor cable to hermetically seal said cable entry.

2. A method of making a hermetically sealed conductor cable entry through an aperture in the metallic casing of a hermetically sealed unit comprising the steps of: forming the aperture with an outwardly extending sealing collar with a surrounding outwardly extending annular stepped-up portion and inserting a cylindrically shaped insulating bushing within said aperture, said bushing being concentrically disposed on the cable conductor, and having an outside diameter substantially equal to the inside diameter of said aperture, and deforming said stepped-up portion downwardly into coplanar relationship with the metallic casing to cause from ten to twenty percent reduction in the diameter of at least a portion of said sealing collar and cause said sealing collar to exert a radial pressure about said resilient bushing and said conductor to hermetically seal said cable entry.

3. A method of making a hermetically sealed conductor cable entry through an opening in a metallic casing of a hermetically sealed unit comprising: forming an aperture in a metallic plate member with an outwardly extending sealing collar with a surrounding outwardly extending annular stepped-up base portion, inserting in said aperture a cylindrically shaped resilient insulating bushing concentrically disposed about the conductor cable, said bushing having an external diameter substantially equal to the internal diameter of said aperture, deforming said stepped-up portion downwardly into coplanar relationship with the metallic plate member to effect a reduction ranging from ten to twenty percent in the diameter of at least a portion of said collar thereby causing a compressive radial force to be exerted against said resilient bushing and said cable conductor, and joining said metallic plate member to the metallic casing to effect a hermetically sealed entry of the conductor cable through said opening in said metallic casing.

References Cited in the file of this patent

UNITED STATES PATENTS

| 2,433,911 | Johnston | Jan. 6, 1948 |

FOREIGN PATENTS

| 100,795 | Australia | Apr. 29, 1937 |
| 621,252 | Great Britain | Apr. 6, 1949 |
| 667,393 | Great Britain | Feb. 27, 1952 |
| 669,580 | Great Britain | Apr. 2, 1952 |
| 759,550 | Great Britain | Oct. 17, 1956 |